United States Patent [19]
Nelson

[11] 3,975,590
[45] Aug. 17, 1976

[54] FACSIMILE COPY MEDIUM MAGAZINE

[75] Inventor: Richard L. Nelson, New York, N.Y.

[73] Assignee: Exxon Research and Engineering Company, Linden, N.J.

[22] Filed: Dec. 16, 1974

[21] Appl. No.: 533,195

Related U.S. Application Data

[62] Division of Ser. No. 333,616, Feb. 20, 1973, Pat. No. 3,872,239.

[52] U.S. Cl. .................................. 178/5; 178/42; 346/138
[51] Int. Cl.² ........................................ B65D 85/14
[58] Field of Search ................ 178/6, 5, 42, 13; 346/146, 138; 312/50, DIG. 9; 206/491, 69

[56] References Cited
UNITED STATES PATENTS

| | | | |
|---|---|---|---|
| 1,052,940 | 2/1913 | Morris | 346/138 |
| 1,676,848 | 7/1928 | Au | 346/138 |
| 1,735,894 | 11/1929 | Coombs | 40/306 |
| 1,784,366 | 12/1930 | Littlefield | 206/69 |
| 2,096,351 | 10/1937 | Semonsen | 24/17 |
| 2,145,072 | 1/1939 | Cooley | 178/13 |
| 2,332,857 | 10/1943 | Karg | 206/69 |
| 2,710,191 | 6/1955 | Williams | 346/138 |
| 3,148,992 | 9/1964 | Hewitt | 206/69 |
| 3,285,406 | 11/1966 | Winesett | 206/491 |
| 3,491,344 | 1/1970 | Ferber | 346/146 |

Primary Examiner—Howard W. Britton
Attorney, Agent, or Firm—N. Norris

[57] ABSTRACT

A facsimile transceiver comprising a document/copy receiving drum, a motor for rotation of the drum about the drum axis and a read/write head mounted for linear movement in a direction parallel with the drum axis. When the transceiver is operating in the receive mode, the copy medium having adhesive along at least one edge circumscribes the drum in a closed loop so as to eliminate the necessity for transmitter-receiver angular synchronizing signals which would otherwise be required for locating the copy margin adjacent the edge of the copy paper. After completion of a transmission, the copy medium is severed along a line so as to provide an appropriate margin for the copied information content. The copy medium may comprise a magazine having a plurality of sheets of a copy medium which form individual closed loops where one edge of each sheet overlaps with and is attached to the opposite edge of the sheet. Tear strings may be provided for shearing the copy paper loop so as to provide an appropriate margin for the copy.

6 Claims, 18 Drawing Figures

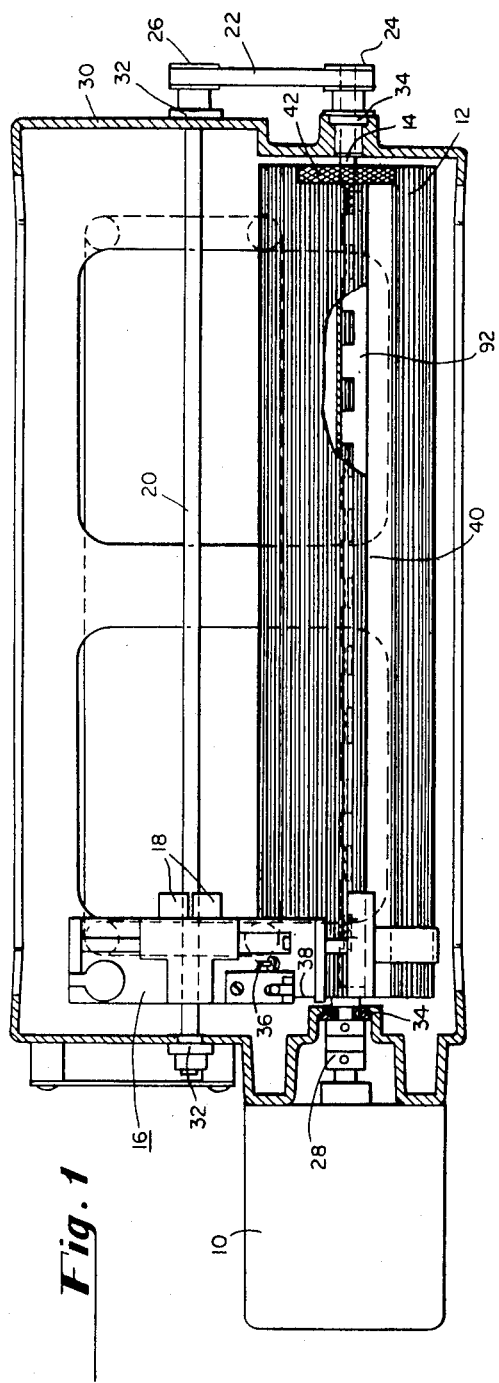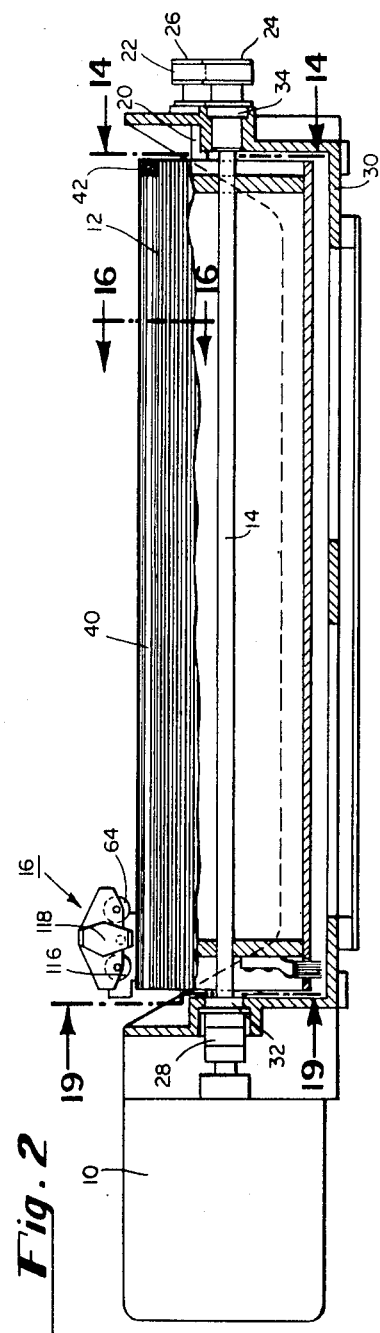

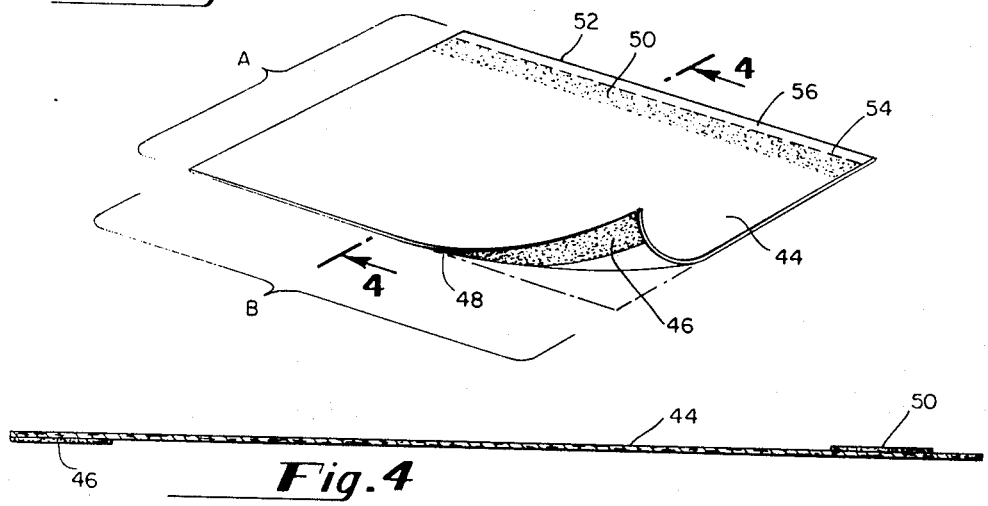
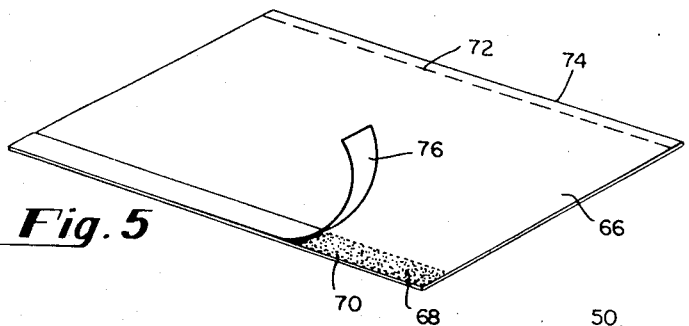
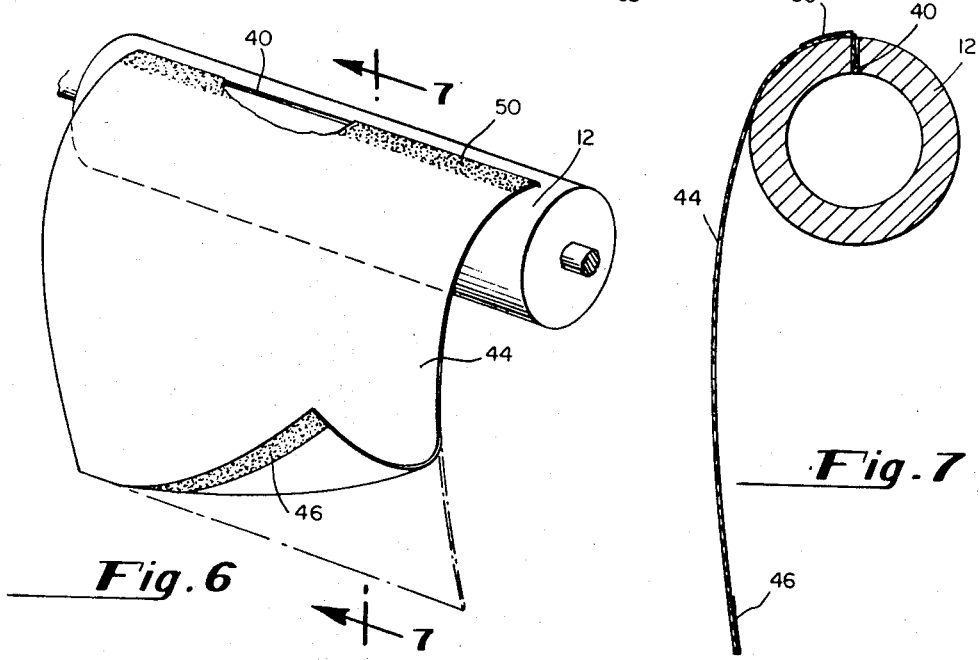

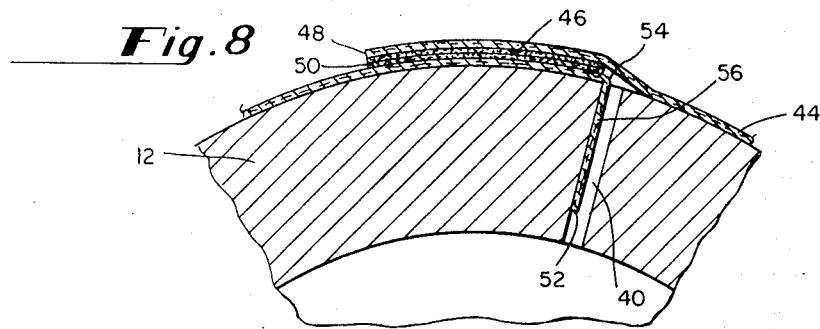
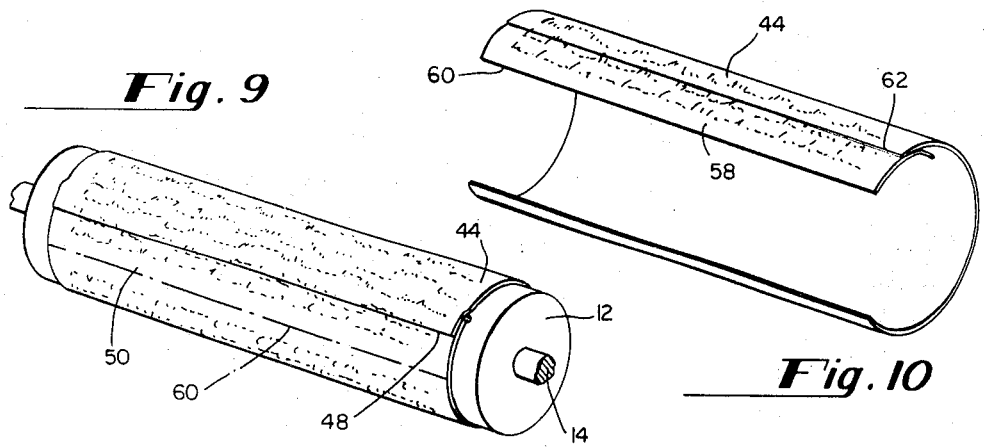
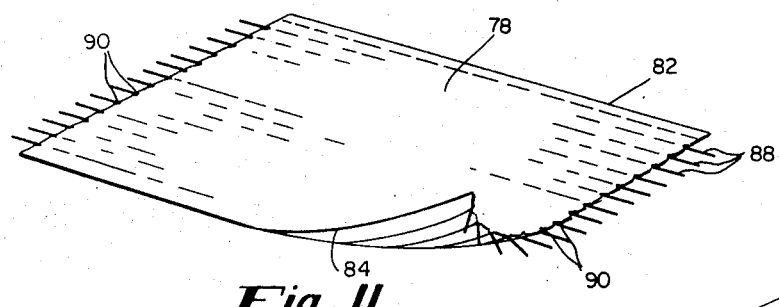
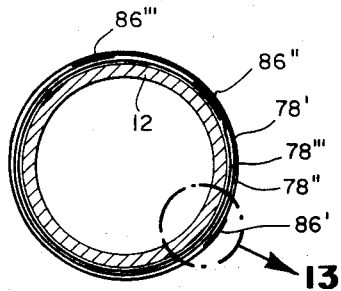
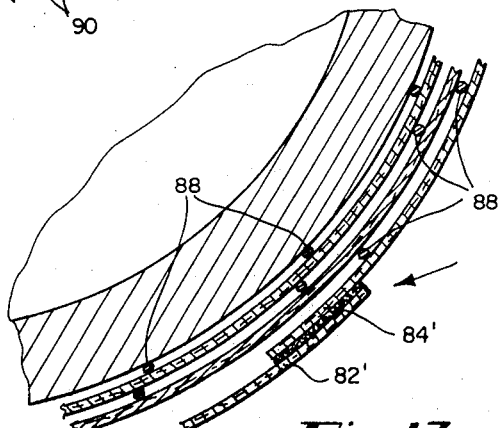

FACSIMILE COPY MEDIUM MAGAZINE

RELATED APPLICATIONS

This application is a division of application Ser. No. 333,616 filed Feb. 20, 1973; now U.S. Pat. No. 3,872,239.

Certain aspects of the facsimile apparatus disclosed herein are also disclosed in my copending application Ser. No. 333,615 filed Feb. 20, 1973 now abandoned in favor of continuation-in-part application Ser. No. 412,989 filed Nov. 5, 1973; a copending application of Luther R. Winters, Jr. Ser. No. 332,927 filed Feb. 16, 1973 and a copending application of Herbert P. Ford, Jr. Ser. No. 332,925 filed Feb. 16, 1973 assigned to the assignee of this invention.

BACKGROUND OF THE INVENTION

This invention relates to facsimilie systems comprising a transmitter, a receiver and a communications network such as telephone lines therebetween. The transmitter employs a scanning or reading element which reads the information content of an original document. The original document is moved relative to the reading means such that successive paths are scanned whereupon the output of the scanning element is fed to a device such as a photodetector which converts the variations in light intensity received by the scanning element due to variations in the reflectivity of the scanned document to electrical signals. These electrical signals then convey information concerning the radiation absorption, emission or reflection of the scanned document. The electrical information-bearing signals are then transmitted to a receiving unit over suitable means such as a telephone network where the receiving unit converts the electrical information-bearing signals from the transmitting unit to marks or images on a receiving copy medium so that the received copy is a reasonable facsimile of the original scanned document.

In one type of conventional facsimile system, the copy medium comprises a sheet of paper which is applied to the receiving drum with opposite edges of the paper abutting or overlapping so as to form an open loop having a discontinuous copy medium surface. In order to assure that the margin of the copy is appropriately located with respect to the edge of the sheet, angular synchronizing signals are utilized. These signals assure that the position of the document edge passes the reading head of the transmitter at the same time that the copy edge passes the writing head of the receiver, and this in turn assures the proper location of the copy margin with respect to the edge of the copy sheet. In other words, the copied matter is placed on the copy sheet in substantial conformance with its location on the document being copied.

U.S. Pat. No. 3,582,550 — Latanzi is illustrative of the complexity which is involved in maintaining synchronization between transmitter and receiver drums in prior art systems. In this particular prior art system, a variable frequency generator drives the drum motor at the receiver in response to an error signal indicative of the relative positions and speeds of the transmitter and receiver drums. An elaborate clutch mechanism is shown in U.S. Pat. No. 3,569,628 — Okleshen which is utilized in effecting synchronous phase operations between a transmitter and a receiver. These synchronizing arrangements add expense to a facsimile system as well as making it difficult to increase the rate of transmission.

SUMMARY OF THE INVENTION

It is an object of this invention to provide a relatively low cost facsimile system.

It is more specific object of this invention to provide a copy medium for a relatively low cost facsimile system which does not require synchronizing signals.

In accordance with this invention, a copy medium magazine for use in a facsimile system comprises a plurality of substantially concentric closed loops of copy medium. Individual closed loops may comprise separate sheets of copy medium having one edge of each sheet overlapping with and attached to the opposite edge of the sheet. As an alternative, a copy medium may comprise an integral member which is wrapped in a spiral fashion with the layers of the spiral being attached to one another by adhesive means or the like.

In order to appropriately locate the margin on the copy medium, each layer of the copy medium may comprise a plurality of tear strings extending along generally parallel tear lines so as to facilitate the breaking of the closed loop at any of the tear lines as required for appropriate placement of the margin.

BRIEF DESCRIPTION OF THE DRAWINGS

FIG. 1 is a top plan view of a facsimile transceiver constructed in accordance with the invention;

FIG. 2 is a front view of the transceiver shown in FIG. 1;

FIG. 3 is a perspective view of a sheet of copy paper having self-bonding adhesive on both sides which may be utilized in the transceiver of FIGS. 1 and 2;

FIG. 4 is a sectional view taken along line 4—4 of FIG. 3;

FIG. 5 is a perspective view of another embodiment of the sheet of copy paper wherein an adhesive strip is provided on only one side of the copy paper;

FIG. 6 is a perspective view of the copy paper of FIG. 3 being applied to the cylindrical drum of the transceiver shown in FIGS. 1 and 2:

FIG. 7 is a cross-sectional view taken along line 7—7 of FIG. 6;

FIG. 8 is an enlarged partial cross-sectional view of the paper and clamping slot shown in FIG. 6;

FIG. 9 is a perspective view of the copy medium secured in a closed loop around the drum shown in FIGS. 1 and 2 with copied information thereon;

FIG. 10 is a perspective view of the copy medium shown in FIG. 9 after severing and removal from the drum;

FIG. 11 is a perspective view of another type of closed loop copy medium which may be utilized in accordance with this invention;

FIG. 12 is a cross-sectional view of the copy medium of FIG. 11 secured in a closed loop around the drum shown in FIGS. 1 and 2;

FIG. 3 is an enlarged view of a portion of FIG. 12;

DETAILED DESCRIPTION OF A PREFERRED EMBODIMENT

Figure 18:
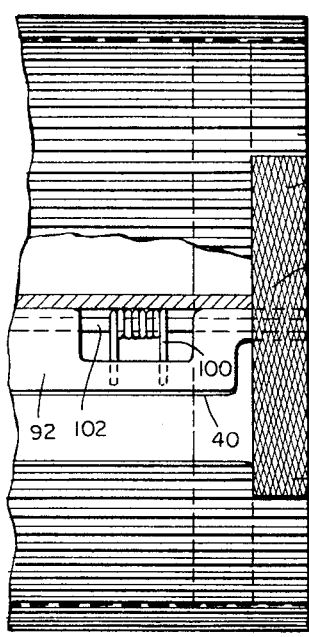
FIG. 18 is an enlarged fragmentary view of the end of the transceiver drum with the copy clamp in the closed position.
Figure 14:
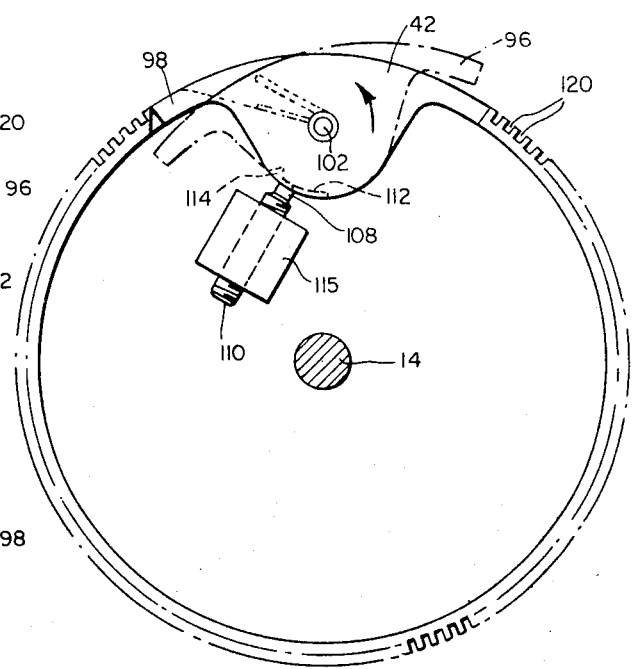
FIG. 14 is a sectional view of the facsimile transceiver shown in FIG. 2 taken along section line 14—14.

Referring to FIGS. 1 & 2, a facsimile transceiver comprises a synchronous motor 10 which drives a document/copy receiving drum 12 rotatably about a drum shaft 14 which extends along the drum axis while also driving a scanning head 16 along a substantially linear path parallel to the drum axis. The head is advanced along the linear path by the cooperation between a head drive mechanism 18 and a shaft 20 which is located rearwardly of and parallel to the drumshaft and is also driven by the motor 10 via a belt 22 which couples the shaft 20 to the shaft 14. Pullies 24 and 26 secured to the shafts 14 and 20 respectively are provided for the belt 22, while a flexible coupling 28 connects the motor drive shaft of the motor 10 to the shaft 14. The motor 10, the drum 12 and the head 16 are supported for rotation on a molded u-shaped frame 30 wherein the head shaft 20 and the drum shaft 14 are journaled in bearings 32 and 34 respectively.

In accordance with an important aspect of the invention shown and described in the aforesaid copending application Ser. No. 333,615 the head 16 shown in FIGS. 1 and 2 is a read/write head giving the transceiver the dual capability of transmitting information scanned by the head on an original document applied to the drum 12 while also having the capability of receiving and then writing on a copy medium secured on the drum 12 as the head 16 scans in a direction parallel with the axis of drum rotation. More particularly, the head 16 comprises an optical scanner including a bundle of fiber optics 36 which extends through an opening into close proximity with the surface of the drum 12. The fiber optics serve to detect light-dark variations in the original document applied to the drum when the transceiver is operating in the transmitting mode. The head 16 also includes a stylus 38 which extends into contact with an electrosensitive copy medium carried by the drum so as to mark the copy medium in accordance with a received information-bearing signal applied to the transceiver when operating in the receiving mode.

In accordance with this invention and in accordance with the invention of my copending application Ser. No. 533,194 filed Dec. 16, 1974, the copy medium applied to the drum 12 forms a closed or endless loop thereabout so as to eliminate the necessity for synchronizing the initial relative angular position of the original document on a transmitting transceiver drum with respect to the initial relative angular position of the copy medium on a receiving transceiver drum 12. In this connection, the drum 12 includes an axial slot 40 which extends for the entire length of the drum 12 at the periphery thereof. The slot 40 has a clamping mechanism associated therewith which will be described in somewhat greater detail subsequently, which clamping mechanism is opened and closed by a finger engagable member 42. The nature of the copy medium which is inserted into the slot 40 with the capability of forming a closed loop of continuous copy medium will now be described in substantial detail.

In accordance with this invention and as shown in FIGS. 3 and 4, the copy medium applied to the drum comprises a sheet of paper 44 having a width A slightly larger than the circumference of the drum 12 and a length B slightly smaller than the length of the drum 12. The paper 44 includes on one face a strip of adhesive material 46 which is located immediately adjacent a first edge 48 which extends along the length of the paper 44. This adhesive material may be a contact adhesive which bonds when brought into contact with the opposite side and edge of the paper or itself. Preferably, it is characterized by bonding only to a like material. Another adhesive strip 50, slightly narrower than the strip 46, is located adjacent the opposite edge 52. Adhesive strip 50 is located on the opposite face of the paper 44 and spaced slightly back from the edge 52 behind a perforated line of weakness 54. The adhesive strip 50 comprises the same material as the strip 46 and therefore will only stick to the adhesive strip 46.

The paper 44 may be easily applied to the drum 12 as depicted in FIGS. 6, 7 and 8 by inserting the strip 56 between the perforated line 54 and the edge 52 into the slot 40 so that the line 54 aligns with the near edge of the slot 40 and wrapping the paper 44 around the drum 12 until the adhesive strip 46 is brought into overlapping contact with the adhesive strip 50. As shown in FIG. 8, when the paper is placed in circumscribing relationship around the drum 12, the strips 46 and 50 will be disposed in overlapping relationship and the extra width of the strip 46 will insure that none of the adhesive strip 50 is exposed and permit clamping in the slot 40 to assure that the paper is secured in proper place on the drum 12. The perforations 54 not only provide means of conveniently bending the strip 56 so as to allow for easy insertion into the slot 40, but also provide a means for aligning paper 44 by aligning the perforations 54 with the near or forward edge of the slot 40. Of course, the perforations may be replaced by a score line, printed line or other suitable means of marking or weakening the paper 44 along that line so as to facilitate clamping and proper alignment of the paper on the drum 12.

Once the paper has been applied to the drum 12 and the strip 46 has been bonded to the strip 50 as best shown in FIG. 8, the transceiver of FIGS. 1 and 2 may be placed in the receive mode and the message received from the transmitting transceiver. When the transmission of the information is complete as depicted in FIG. 9, the sheet 44 may be cut along an appropriate line 60 so as to properly center the information content on the sheet 44, i.e., locate the edge of the paper so as to provide a suitable margin 58 shown in FIG. 10 at the resulting edge 60 of the sheet 44 as shown in FIG. 10. The sheet 44 will have a seam 62 where the adhesive strips 50 and 46 overlap, which corresponds to the original paper edge 62. However, this seam is not considered objectionable since the copy medium may be written on adjacent and even over the seam 62. The strip 56 may be removed by tearing along the perforations 54.

In FIG. 5, the copy medium comprises a sheet 66 having a single strip of adhesive material 68 located immediately adjacent edge 70 while the perforated line of weakness 72 is located adjacent the opposite edge 74. In this particular embodiment, the adhesive strip 68 is capable of forming a bond with different materials. Accordingly, in order to prevent the strip 68 from sticking inadvertently to another surface, a protective covering 76 which may comrpise plastic or some other readily removable material such as wax paper is provided. The covering 76 may then be removed just prior to applying the sheet 66 to the drum 12.

In FIGS. 11–13, and in accordance with this invention, another type of copy medium is shown comprising a plurality of sheets 78 which are wrapped around the drum 12 so as to provide a magazine or cassette and avoid the need for separate sheets of copy paper being applied to the drum each time the transceiver is utilized in the receiving mode. The sheets 78 of the copy medium (three sheets being shown in FIGS. 12 and 13 for purposes of illustration) are secured about the drum 12. Each sheet is provided with adhesive material which may be arranged as described in either of the embodiments heretofore discussed. Thus, as shown in FIG. 13, the first sheet 78' is wrapped around the drum 12 with the opposite edges 82' and 84' overlapping and at least one surface of the sheet 78' carrying adhesive forming a bond at a location generally designated as 86'. An edge of the next sheet 78'' is then wrapped around the sheet 78' with the opposite edges 82'' and 84'' overlapping to form an adhesive bond generally designated as 86'' which is angularly displaced with respect to the adhesive bond 86'. The same is true with respect to the third sheet 78''' and any subsequent sheets which are applied to the magazine or cassette. To prevent slippage between the sheets 78', 78'', and 78''', adhesive may be utilized between the sheets.

To facilitate the proper location of the margin for each sheet 78, each sheet is provided with a plurality of tear strings 88 on one side thereof as best shown in FIG. 13. The strings extend in the direction which corresponds to the drum axis when the sheet is secured to the drum. After a copy medium is filled with information content at the completion of a transmission, an appropriate tear string 88 may be pulled so as to center the information content on the sheet 78. These tear strings may be bonded to the paper by suitable adhesive means. To facilitate tearing of each sheet of paper, opposing edges of each sheet may include a plurality of spaced V-shaped grooves or notches 90 corresponding to the location of the tear strings 88. Thus, the initial pulling on the tear string to form the desired margin will be facilitated since the initial pulling of the string will be aligned with the apex of the notch and thus avoid inadvertent tearing of the paper. A cylindrical support (not shown) may be provided between the drum 12 and the sheets 78, in order to form a complete magazine for insertion on the drum. Note also that a hybrid copy medium utilizing adhesive along at least one edge and tear strings may be provided. Such a sheet could be applied to a drum individually or with others so as to form a magazine.

In another embodiment of the invention, the magazine of paper may comprise a continuous sheet of paper wrapped in spiral fashion about the cylindrical magazine support member. In this embodiment, the single sheet of paper would be rolled on the support member or the like in a continuous spiral to form as many standard sheets of copy paper as may be desired on a single magazine. The initial edge of the paper might be bonded to the drum by adhesive or the like, and a similar bond might be used between each layer of paper circumscribing the drum. Tear strings or perforations or the like may be provided along the one side of the paper at intervals corresponding to a sheet and extending in the direction of the drum axis to facilitate removal of each sheet of paper at its margin once the imprinted matter is disposed thereon. In this particular embodiment, angular synchronizing would be required to insure that the margin of the received copy corresponds to the margin of the transmitted matter at the position of the tear string.

Figure 16:
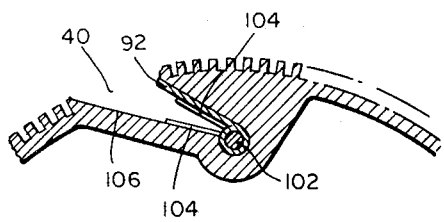
FIG. 16 is a sectional view of the drum shown in FIG. 1 taken along section line 16—16 with the copy clamp closed.
Figure 17:
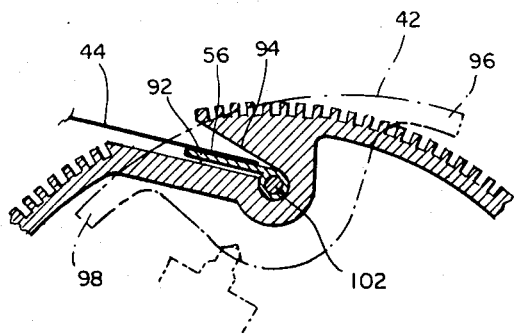
FIG. 17 is a sectional view of the transceiver drum shown in FIG. 2 taken along section line 16—16 with the copy clamp open.

As mentioned previously, the drum 12 comprises a slot 40 having a clamping mechanism for receiving an edge of a copy medium sheet so as to hold it in the proper position on the drum 12. Reference will now be made to FIGS. 14 and 16–18 for a more detailed description of the clamping mechansim. As shown in FIG. 17, a movable clamping member 92 which extends axially in the slot 40 along a substantial portion of the drum so as to receive an edge of a copy medium sheet when in the open position, e.g., portion 56 of the sheet 44. The clamping member 92 is pivotally mounted on a shaft 102 at the base of the slot 40 and is movable between open and closed positions. In the open position, the finger engagable member 42 assumes the position shown in broken lines in FIGS. 14 and 17. Once the portion 56 is in place between the movable clamping member 92 and the upper clamping surface 94 of the drum slot 40, the member 42 may be depressed at the end 96 to urge the movable clamping member 92 upward against the clamping surface 94 to hold the strip 56 of the sheet 44 therebetween. The closed position of the clamp is depicted in FIG. 16 absent the sheet 44. In order to release the sheet 44 from the clamping mechanism, the other end 98 of the finger engageable member 42 may be depressed so that the clamping mechanism assumes the open position shown in FIG. 17.

In order to maintain the clamping mechanism in its closed position, the clamp 92 is biased upward by a conventional spring member 100 which is carried by the shaft 102. One arm 104 of the spring 100 presses upward against the under side of the movable clamping member 92 and the other arm 104 presses downward against the bottom or lower slot surface 106 thereby forcing the clamping member 92 up against the slot surface 94. However, by pushing on the end 98, detent 108 carried at the end of an adjustable screw 110 slidably engages a groove 112 on the lower or interior side of the clamping member 92 and, as the end 98 is depressed further, it will lock in place in a depression 114. This depression 114 is of sufficient depth to hold detent 108 in place so that the clamping mechanism is held open even through the spring 100 tends to urge it closed. Only when pressure is applied to the end 96 of the clamping member 42 will the member 42 move in a manner so that the detent 108 disengages from the depression 114. The detent 108 is adjustable in relation to the depression 114 by adjusting the position of the screw 110 in a mounting block 115 carried by the frame. In this manner, an edge of the copy medium may be clamped into place in the slot along an edge thereof. It will of course be appreciated that other clamping mechanisms may be used.

The cutting means which comprises a cutting roller 64 (a blade might also be utilized) is rotatably carried by the head 16. As best shown in FIG. 2, the head includes the cutting roller 64 as well as an opposite relatively soft roller 116. In the receiving or transmitting mode, the head 16 will advance in an axial direction with neither the cutting roller 64 nor the soft roller 116 in contact with the copy medium or original document carried by the drum. By manually twisting a head knob 118 which projects forward from the head 16, the cutting roller 64 or the roller 116 may be selectively brought into contact with the copy medium. By twisting in a clockwise direction, the cutting surface of the roller 64 is brought into contact with the copy medium to allow the roller 64 to engage and sever the copy medium as the head 16 is moved manually or automatically in an axial direction along the shaft 102. Prior to severing the copy medium, the drum must be rotated to a position so that the cutting roller 64 will engage the copy medium along a line which will establish an appropriate margin for the information content on the copy medium. If the knob 118 is rotated in a counterclockwise direction, the roller 116 will be brought into contact with the copy medium. As shown in FIG. 19, the roller 116 is rather broad so as to ride easily along the surface of the copy medium on the drum 12.

In order to assist in guiding the cutting roller 64 along a straight line so as to provide a suitable edge for the copy medium after severing, the drum 12 comprises a plurality of peripheral surface grooves 120 which extend axially along the drum. By providing a close and frequent spacing between the grooves 120, it is possible to sever the copy medium along any one of the number of closely spaced lines. This assures that the copy medium may be severed along a line so as to establish a suitable margin for the information on the copy medium.

Figure 15:
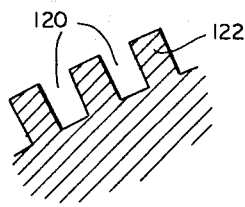
FIG. 15 is an enlarged view of the grooves in the surface of the drum shown in FIG. 14.

As shown in FIG. 15, the grooves 120 are separated by blunt projections 122. It will of course be appreciated that the projections 122 as well as the relatively flat bases of the grooves 120 may have a different configuration, e.g., V-shaped, although this particular configuration is deemed to be desirable since it does provide good shearing action for the cutter wheel when the wheel is pushed along the drum axis in grooves 120 by maximizing the surface area supporting the copy medium.

To permit the cutting roller 64 to advance freely across and thereby sever the copy medium, a novel head drive mechanism is utilized which is the invention of Luther R. Winters, Jr. and the subject matter of the aforementioned copending application Ser. No. 332,927.

Although the copy medium has been described as electrosensitive and capable of being marked on in response to the current applied at the stylus of the writing means, other types of copy medium and writing means may be utilized. For example, the copy medium may be marked on in response to the heat generated by the stylus at the contact point. This is known as thermal printing, or the stylus may be maintained in mechanical contact with the paper, thus printing through a carbon between the stylus and the paper or rupturing dye containing capsules on the paper surface commonly known as NCR paper. Also, a modulated light source, such as a light emitting diode may be utilized which is focused on a photo or thermally or ultra-violet sensitive paper.

Although a specific embodiment of the invention has been shown and described, other embodiments and modifications may occur to those of ordinary skill in the art, and the appended claims are intended to cover any such modifications which fall within the true spirit and scope of the invention.

What is claimed is:

1. A copy medium magazine for use in a facsimile system comprising a cylindrical drum, said magazine comprising a plurality of generally rectangular sheets of copy medium forming individual closed loops where one edge of each sheet overlaps with and is attached to the opposite edge of said sheet, said overlapping edges of each sheet being angularly displaced with the overlapping edges of other sheets.

2. The magazine of claim 1 wherein each of said sheets comprises a plurality of tear strings extending along lines generally parallel with the opposing edges of said sheets so as to facilitate the breaking of the closed loop formed by each of said sheets at any of said lines.

3. A copy medium magazine comprising a plurality of layers of copy medium each of said layers forming a substantially closed loop.

4. The copy medium magazine of claim 3 wherein each of said closed loops comprises a rectangular sheet having one edge overlapping and attached to the opposite edge of said sheet.

5. The copy medium magazine of claim 4 wherein the overlapping edges of each of said sheets is angularly displaced with the overlapping edges of the other of said sheets.

6. The copy medum magazine of claim 4 comprising a plurality of tear strings extending along lines generally parallel with opposing edges of said sheets so as to facilitate the breaking of the closed loop formed by each of said sheets at any of said lines.

* * * * *